Sept. 5, 1961  E. NELKEN  2,999,147
ELECTRIC WELDING APPARATUS
Filed April 21, 1959

Inventor:
Ewald Nelken
by:
Michael S. Striker
Attorney

United States Patent Office 2,999,147
Patented Sept. 5, 1961

2,999,147
ELECTRIC WELDING APPARATUS
Ewald Nelken, Alfredstrasse 93/95, Essen, Germany
Filed Apr. 21, 1959, Ser. No. 807,883
Claims priority, application Germany Apr. 21, 1958
7 Claims. (Cl. 219—143)

The present invention relates to an electric welding apparatus and more particularly to an improved electrode holder in such an electric welding apparatus.

It is an object of this invention to provide a pivotally mounted electrode holder in which the parts providing the pivoting movement do not conduct any electricity to the electrode.

It is another object of this invention to provide a pivoting electrode holder which is easy to manufacture and cheap to produce.

It is still another object of the invention to provide a pivoting electrode holder in which the parts providing the pivot movement are insulated from the electric cable.

With these objects in view, an electric welding apparatus according to the invention comprises, in combination, a support member, an insulated electric cable mounted on the support member and having a bare conductive end portion, non-conductive holding means adapted to hold an electrode and including means for holding the conductive end portion in engagement with the electrode, and non-conductive pivoting means pivotally connecting the support member with the holding means, whereby all current passes directly through the electrode without passing through the support member, the holding means and the pivoting means.

In a preferred embodiment, an electric welding apparatus according to the invention comprises further a locking means mounted on the pivoting means for releasably locking the pivoting means against pivoting in a selected position.

Another embodiment comprises a telescoping sleeve facilitating insertion of the electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
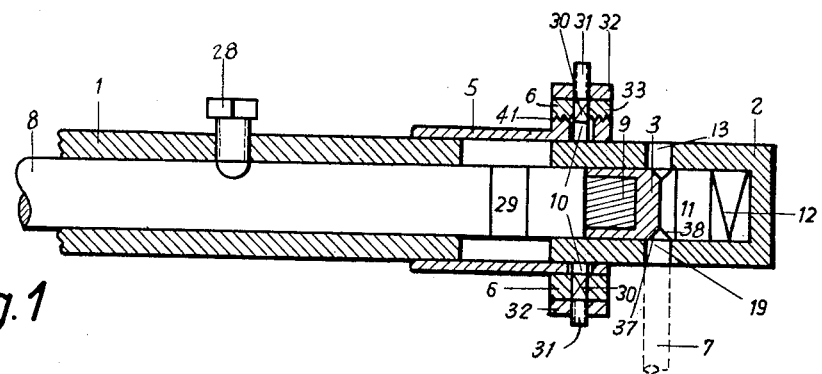
FIG. 1 is a part sectional view of an electrode holder according to the present invention.

Referring now to FIG. 1, there is shown a welding electrode holder comprising a tubular support member 1 which has an insulated cable 8 mounted therein. Insulated cable 8 is secured against movement in support member 1 by set screw 28. A tubular electrode holder 2 carries two pivot members or pins 10. Arms or levers 5 are fixed to the support member 1 and each thereof is formed with a boss 33 surrounding the respective pivot member 10 for pivotal movement thereon. Pivot members 10 are threaded at their outer ends 31 and are provided with square portions 30 adjacent the threaded ends 31. Surrounding the square portion 30 are the securing rings 6 which are thus secured against rotation on pivot members 10 and threaded on the portion 31 are the nuts 32. If the nuts 32 are threaded downwardly on threads of portions 31, the locking nuts 6 will bear against the bosses 33 and lock the holding means 2 against further pivotal movement. Teeth 41 on one of the rings 6 and on the adjacent boss 33 lock the holder 2 in selected positions.

Cable 8 has a bare conductive end portion 9 which is secured by welding or soldering to a cap shaped conducting contactor 3. Contactor 3 is free to move within the holding element 2 to a certain extent when the electrode is inserted since cable 8 is provided with a loop 29 intermediate of the support member 1 and holding element. Consequently, a pivotal movement of the holding element will not stretch cable 8 while loop 29 urges contactor 3 into holding means 2. Holding means 2 is closed at its outer end and contains a resilient element in the form of a helical spring 12. Intermediate spring 12 and the conducting element 3 is placed a non-conductive spacing or electrode retaining member 11. Spring 12 will urge member 11 against the conducting element 3. Apertures 13 and 19 are provided on opposite sides of the holding element for the insertion of an electrode 7 between members 3 and 11. Contact member 3 and member 11 are provided with chamfers 37 and 38 respectively located in the region of the apertures 13 and 19. Electrodes are inserted by passing them first through aperture 19 or 13 as the case may be. By pressing electrode 7 against chamfers 37, 38, distance piece 11 and contact member 3 will be pushed apart allowing the electrode to enter between members 3 and 11 and to pass through the aperture on the opposite side of holding means 2. Spring 12 will urge the distance member 11 against electrode 7. At least one of the apertures 13 and 19 may be oval so that electrode 7 can enter more easily and can be more securely held in holding means 2.

When nuts 32 are slackened, holding member 3 can be pivoted over a wide arc and cable 8 will not be stretched or moved due to the presence of loop 29 and the set screw 28 which holds cable in the support member 1.

When holding member 2 has been pivoted into the selected position, nuts 32 can be screwed fast and this will prevent further pivoting of holding member 2 until the nuts 32 are again unscrewed. It should be noted that cable 8 is fully insulated from holding means 1 by its sheathing.

Levers 5 and the other parts comprising the pivoting elements are fully insulated. Spring 12 can be made, if so desired out of a conductive material. Spring 12 is however insulated by the insulating distance member 11. Electricity to the electrode 7 is therefore supplied solely to the blank end 9 and the contactor 3.

Pivoting electrode holders proposed hitherto have electric conductive pivoting members. If a pivoting member is also conducting electricity, sparking and heating up will easily and quickly develop. A construction wherein the pivoting elements also carry electricity will of course have to be insulated on the outside and this leads to a very heavy, unhandy, unwieldy and very clumsy construction.

Figure 2:
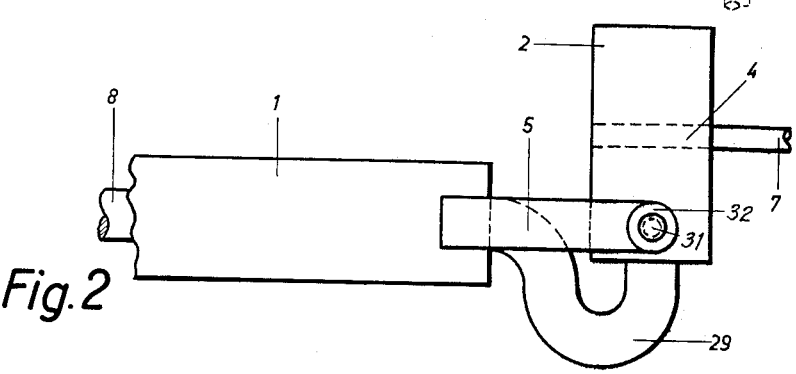
FIG. 2 is a plan view of a modification of the electrode holder shown in FIG. 1.

FIG. 2 is a plan view of a construction as illustrated in FIG. 1 with a modification that the holding means 2 have apertures 4 for holding electrode 7 positioned at 90° as shown in FIG. 1. FIG. 2 also shows a holding means 2 in a position normal to support FIG. 1. In this position the configuration of loop 29 and the absence of any pull on the cable 8 within the holding means 1 is clearly shown. Set screw 28 is omitted from FIG. 2 for clarity's sake.

Figure 3:
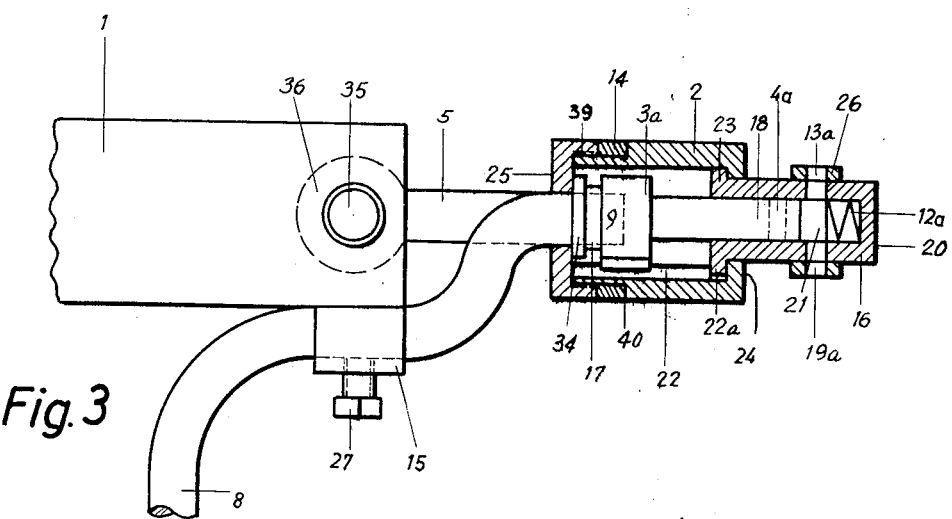
FIG. 3 is a sectional view of pivoted electrode holder of another embodiment.

In the embodiment of FIG. 3, cable 8 is held to support member 1 on the outside thereof. A clamp 15 is secured to support cable 8 mounted within clamp 15. Between support member 1 and a holding means 2 a loop of cable 8 is provided. In the partly sectional view of FIG. 3 the upper lever or arm 5 is omitted for the sake of clarity. Holding means 2 are provided with a thread 39 at the end thereof near to support member 1. A ring 14 is placed over thread 39 and against a shoulder 40 of holding means 2 so that the threaded cover 25 will hold ring 14 securely on holding means 2. Fixed onto ring 14 are the arms 5, only one being shown in FIG. 3, pivotally mounted by a boss 36 on pivot 35 held on support member 1. Means for locking arms 5 and therefore holding means 2 against pivotal movement and freeing the same for the pivotal movement about support member 1 are provided similar to the one described in connection with the construction of FIG. 1. Onto the bare conductive end portion 9 of cable 8 is screwed the conductive sleeve 34. Sleeve 34 abuts against inner shoulder of covering member 25 and therefore holds the end of cable 8 within the holding member 2. Screwed onto the sleeve 34 is the contactor 3a. Contactor 3a carries an extension 18 which is provided with an aperture 4a. A non-conductive extension sleeve 16 has a shoulder or abutment means 23 adapted to slide telescopically within the bore of the holding means 2 and to prevent complete withdrawal of the sleeve 16 by engaging with the abutment means 24. The outer end of extension sleeve 16 is closed by wall 20 and contains a resilient element in the form of a coil spring 12a which urges the distance piece or retaining member 21 inwardly against the conductive extension member 18. Extension sleeve 16 carries on each side a boss 26. When member 16 is pressed inwardly the apertures 13a and 19a can be brought into alignment with aperture 4a. The electrode can now be inserted and the spring 12a will force a distance piece 21 against it, and hold the electrode in place. Electric supply will pass through cable 8 through bare end portion 9, from there through contactor 3a and extension 18 onto the electrode.

Extension member 18 is preferably on its outer surface provided with an insulation layer on which slides the sleeve 16, which is insulated from the electric current. In a modification sleeve 16 can be provided with an inner insulating layer. Either construction enables the sleeve 16 to be made out of a metallic material. Apertures 4a, 13a and 19a, or at least one of them can be made oval. Boss shaped reinforced portions 26 surrounding apertures 13a and 19a and connected with the outer side of the sleeve 18 serve to protect the apertures against burning. Spring 12, or 12a, as the case may be, will press the retaining member 11 or 21 against the electrodes and therefore the electrode against the part supplying electric current so that a smooth flow of current can be obtained. Shoulder 23 is provided with an extension 22a sliding in a groove 22 of holding means 2 so that the sleeve 16 cannot rotate in relation to means 2.

It will be understood that each of the elements described above, or two or more together, may also find a useful application in other types of an electric welding apparatus differing from the types described above.

While the invention has been illustrated and described as embodied in a pivoting electrode holder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A welding electrode holder comprising, in combination, supporting means; non-conductive tubular electrode holding means; means for connecting said holding means with said supporting means; and electric cable means having an insulated portion connected with said supporting means and an electrode-engaging bare end reciprocably received in said holding means.

2. A welding electrode holder comprising, in combination, supporting means; non-conductive tubular electrode holding means at least slightly spaced from said supporting means; means for articulately connecting said holding means with said supporting means; electric cable means having an insulated portion connected with said supporting means and an electrode-engaging bare end reciprocably received in said holding means; end spring biased retaining means reciprocably received in said holding means for maintaining the bare end in engagement with the electrode.

3. A welding electrode holder comprising, in combination, supporting means; non-conductive tubular electrode holding means having substantially transversely extending electrode-receiving aperture means; means for connecting said holding means with said supporting means; electric cable means having an insulated portion connected with said supporting means and an electrode-engaging bare end extending into said holding means, said cable means forming a loop between said supporting means and said holding means whereby the bare end is reciprocable in said holding means to engage an electrode received in said aperture means; retaining means reciprocable in said holding means in directions toward and away from said bare end; and resilient means for biasing said retaining means toward said bare end whereby the bare end remains in engagement with the electrode.

4. A welding electrode holder comprising, in combination, supporting means; non-conductive tubular electrode holding means having an open first end, a second end, and formed with electrode-receiving aperture means intermediate said ends; means for articulately connecting said holding means with said supporting means; electric cable means having an insulated portion connected with said supporting means, said cable means extending through said first end and comprising an electrode-engaging bare end received in said holding means, said cable means forming a loop between said supporting means and said holding means whereby said bare end is reciprocable in said holding means to engage an electrode inserted through said aperture means; and resilient means for biasing said bare end into engagement with the electrode.

5. A welding electrode holder comprising, in combination, supporting means; non-conductive tubular electrode holding means having an open first end, a second end, and formed with electrode-receiving aperture means intermediate said ends, said holding means formed with external reinforced portions surrounding said aperture means; means for articulately connecting said holding means with said supporting means; electric cable means having an insulated portion connected with said supporting means, said cable means extending through said first end and comprising an electrode-engaging bare end received in said holding means, said cable means forming a loop between said supporting means and said holding means whereby said bare end is reciprocable in said holding means to engage an electrode inserted through said aperture means; and resilient means for biasing said bare end into engagement with the electrode.

6. A welding electrode holder comprising in combination, supporting means; non-conductive tubular electrode holding means comprising two telescopically connected tubular portions, one of said portions having an open end, a closed end and formed with electrode receiving aperture means intermediate said ends; electric cable means having an insulated portion connected with said supporting means, said cable means extending through the other portion and through said open end and having a bare end projecting into said one portion, said cable means forming a loop between said supporting means and said other portion whereby said bare end is reciprocable in said one portion, said bare end formed with aperture means alignable with said first mentioned aperture means upon movement of said portions with respect to each other so that an electrode may be inserted through said first and last mentioned aperture means; and spring-biased means for maintaining the bare end in current-conducting engagement with an electrode inserted through said first and last mentioned aperture means.

7. A welding electrode holder comprising, in combination, supporting means; non-conductive tubular electrode holding means comprising two telescopically connected tubular portions, one of said portions having an open end, a closed end and formed with electrode receiving aperture means intermediate said ends; electric cable means having an insulated portion connected with said supporting means, said cable means extending through the other portion and through said open end and having a bare end projecting into said one portion, said cable means forming a loop between said supporting means and said other portion whereby said bare end is reciprocable in said one portion, said bare end formed with aperture means alignable with said first mentioned aperture means upon movement of said portions with respect to each other so that an electrode may be inserted through said first and last mentioned aperture means; and spring-biased retaining means reciprocably received in said one portion between said closed end and said first mentioned aperture means for maintaining the bare end in current-conducting engagement with an electrode inserted through said first and last mentioned aperture means.

References Cited in the file of this patent

UNITED STATES PATENTS

| | | |
|---|---|---|
| 2,317,780 | Laskey | Apr. 27, 1943 |
| 2,350,426 | Thompson | June 6, 1944 |
| 2,358,220 | Donnelly | Sept. 12, 1944 |
| 2,412,717 | Cotton | Dec. 17, 1946 |
| 2,413,213 | Cardinal | Dec. 24, 1946 |
| 2,428,083 | Kolstad | Sept. 30, 1947 |
| 2,454,617 | Siemers | Nov. 23, 1948 |